United States Patent
Plattner

[15] 3,707,702
[45] Dec. 26, 1972

[54] ANTITHEFT DEVICE FOR VEHICLES

[72] Inventor: Andrew J. Plattner, Detroit, Mich.

[73] Assignee: Kem Krest Products Company, Farmington, Mich.

[22] Filed: Dec. 14, 1970

[21] Appl. No.: 97,679

[52] U.S. Cl................................340/64, 307/10
[51] Int. Cl................................B60r 25/04
[58] Field of Search ............340/63, 64, 65; 307/10; 200/42

[56] References Cited

UNITED STATES PATENTS 3,513,466  5/1970  Isaacs et al. .................340/63 X
3,533,064  10/1970  Perelman.......................340/64 X Primary Examiner—Alvin H. Waring
Attorney—Robert G. Mentag

[57] ABSTRACT

An electrical alarm system for use with a vehicle comprising circuitry that activates an alarm, such as the vehicle horn when the vehicle door is opened or when the vehicle engine hood or vehicle rear deck lid is opened, including a time delay circuit for keeping the horn in an open circuit condition during a predetermined time interval following the opening of the door or following the opening of the hood or rear deck lid, and a de-activating circuit connected to the vehicle engine ignition switch for disabling the system.

5 Claims, 2 Drawing Figures

INVENTOR.
Andrew J. Plattner

ANTITHEFT DEVICE FOR VEHICLES

GENERAL DESCRIPTION OF THE INVENTION

My invention relates generally to electrical alarm systems, and more particularly to an antitheft circuit for a vehicle using a signal device, such as the vehicle horn which is actuated upon unauthorized entry into the vehicle or upon opening of the vehicle engine hood or rear deck lid.

The circuitry includes, in addition to the vehicle horn or other signal device and the vehicle battery, a door switch, such as a jamb switch of the type found in most contemporary vehicles for operating the interior vehicle courtesy lights when the vehicle door is opened. It includes also a hood switch which is actuated when the vehicle hood is opened, and a corresponding switch which is actuated when the vehicle rear deck lid is opened.

The improved circuitry of my invention is adapted to condition the system for automatic triggering of the alarm after the vehicle operator turns the ignition key to the "off" position. When the vehicle operator enters the car, the time delay circuitry begins to function as it conditions the alarm circuit for automatic operation within a predetermined time interval after the vehicle operator opens the door. The alarm system can be deactivated, however, as the vehicle operator turns the ignition key to either the "on" position or the "accessory" position.

When the vehicle operator turns the ignition key to the "off" position, the functioning of the time delay circuit for the hood and deck lid alarms is initiated. The hood and deck lid may be opened and closed without triggering the alarm if this is done before the time delay period expires. The alarm is automatically triggered, however, if the hood or deck lid are opened after the time delay period has expired.

If the alarm is triggered for any reason, it may be stopped by turning the ignition key either to the "on" position or to the "accessory" position.

PARTICULAR DESCRIPTION OF THE INVENTION

Figure 1:
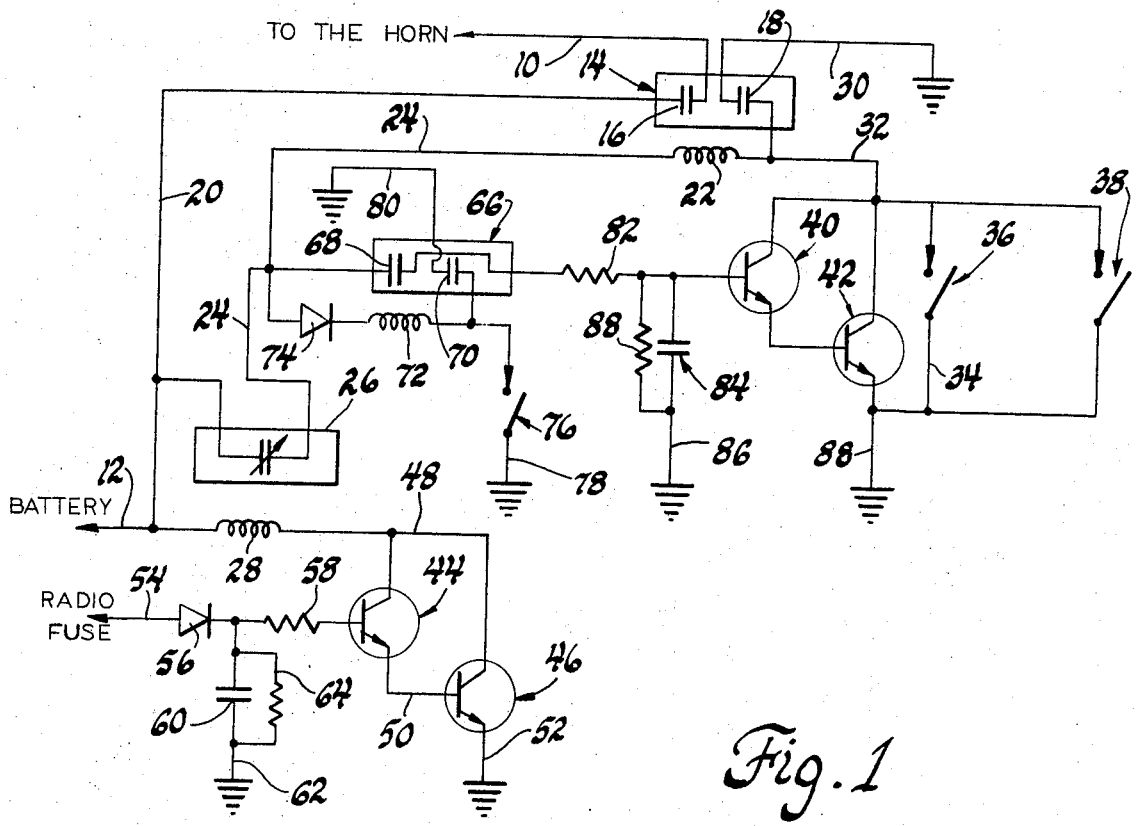
FIG. 1 shows in schematic form an electrical switching circuit employing one embodiment of my invention.

FIG. 1 shows schematically an electric lead for a vehicle horn of an automotive vehicle electrical system. The lead is designated by reference character 10. The opposite side of the horn is grounded in the usual fashion. When the lead 10 is energized, the horn is sounded. The horn is used in my circuitry as the alarm that signals unauthorized entry into the vehicle.

The battery connection is shown at 12. This line 12 may be connected to the positive side of the battery, whereas the opposite side of the battery would be grounded in the usual way.

A double relay assembly 14 having two normally open relays 16 and 18 is situated in electrical line 20 extending from the battery line 12 to the horn 10. The solenoid operator for the relays 16 and 18 is shown at 22. The input side of the solenoid 22 is connected to a line 24 which extends to the output side of the normally closed relay 26. The input side of the relay 26 is connected to line 20 as indicated. The solenoid operator for the normally closed relay 26 is shown at 28.

The output side of the normally open contacts of relay 18 is connected to ground through line 30. The input side of the normally open contacts of relay 18 is connected to line 32, which corresponds to the output side of the solenoid 22.

Line 22 is adapted to be connected to the grounded side 34 of hood jamb switch 36. Situated in parallel with the switch 36 is a rear deck lid jamb switch 38. The input side of the switches 36 and 38 is connected directly to the line 32. Switches 36 and 38 normally are open. They are closed, however, when the hood and rear deck lid respectively are opened. Transistor switching elements are shown at 40 and 42.

If the normally closed relay 26 is closed, and if either switch 36 or 38 is closed, solenoid 22 will trigger the operation of relays 16 and 18, establishing thereby a connection between line 20 and line 10 and actuating the horn. At the same time, line 32 becomes grounded to line 30. Thus even if the engine vehicle hood or the rear deck lid should be closed after the horn alarm is sounded, the horn still will continue to operate because of the completed circuit through contact 18 and the line 30.

The alarm circuit can be deactivated by solenoid 28 and by the deactivating circuit associated with it. That circuit includes transistors 44 and 46, each having a collector that is connected directly to line 48 which in turn is connected to the output end of the solenoid 28. The input end of the solenoid 28 is connected to the battery line 12. The emitter for transistor 44 is connected through line 50 to the base of transistor 46. The emitter for transistor 46 in turn is grounded through line 52.

Line 54 is connected to a portion of the automotive circuitry which is energized when the ignition switch is on. This may be, for example, a radio fuse or some other line connected directly to the output side of the ignition switch. Line 54 is connected through the diode 56 to the input side of resistors 58. It is connected also to input side of storage capacitor 60. The output side of capacitor 60 is grounded at 62. A controlled leakage around the capacitor 60 is provided by resistor 64.

The output side of the resistor 58 is connected to the base of the transistor 44. The transistors 44 and 46 provide a relatively high impedance which will permit the development of a sufficient base emitter voltage bias to trigger their operation.

When the ignition switch is turned on, capacitor 60 begins to charge. Its charging time constant is calibrated to last from 2 to 3 minutes. The voltage developed by the capacitor 60 is transferred to the base of transistor 44 through the resistor 58. When the tripping voltage is reached on the output side of the resistor 58, current flows from energized line 48 through transistor 44 to the base 50, which immediately is triggered thereby establishing a connection in parallel with the transistor 44 extending from the line 48 to the ground 52.

The combined collector current through the transistors 44 and 46 is equal to the energizing current flow through the solenoid 28. When the solenoid 28 is energized, it opens relay 26, thereby disestablishing the connection between the battery and the line 24. This prevents operation of the double relay assembly 14 and interrupts the collector voltage for the transistors 40 and 42.

Diode 56 prevents feed-back of an electrical charge from the capacitor 60 during the capacitor voltage build-up.

The output side of the relay 26 is connected also to the input side of a double relay or switching gate 66. Relay 66 includes normally open switches 68 and 70 and an actuator solenoid 72 for the switches 68 and 70. Solenoid 72 is connected through diode 74, which acts as a rectifier to line 24. The output side of the solenoid 72 is connected to one terminal of door jamb switch 76. The opposite side of the door jamb switch 76 is grounded at 78.

If the switch 76 is closed upon opening of the door of the vehicle, and its relay is closed, a complete circuit is provided for the solenoid 72 which closes the contacts 68 and 70. This immediately connects the output side of the solenoid 72 to the ground line 80 through the contacts 70. Thus relay switch 68 will remain closed even though the door jamb switch is subsequently opened.

The output side of the relay switch 68 is connected to one side of resistor 82. The output side of the resistor 82 is connected to the base of transistor 40. One side of storage capacitor 84 also is connected to the base of transistor 40 and the opposite side thereof is grounded at 86. A controlled leakage resistor 88 is situated in parallel across the capacitor 84 thereby preventing unwanted charging of the capacitor 84 due to residual currents that might exist when the system is de-activated.

When the relay switch 68 is closed upon opening of the door or closing of the door jamb switch 76, a voltage is impressed on the base of transistor 40 and the capacitor 84. As the voltage builds up on the capacitor 84 a triggering voltage for the transistor 40 will be approached. When that triggering voltage is reached, collector current flows from line 32 through the emitter of transistor 40 thereby impressing on the base of transistor 42 a triggering base voltage which causes collector current to flow through the transistor 42 to the ground line 88. This causes the solenoid 22 to close the normally open switch 16 thereby connecting directly the horn line 10 to the battery line 12 thus sounding the alarm. The charging time for the capacitor 84 is approximately 30 seconds. Thus the horn will not be triggered before 30 seconds following the closing of the door jamb switch 76.

When the owner of the vehicle opens the door for entry, the charging time period for the capacitor 84 begins. This charging period can be interrupted, however, by the de-activating circuit. This in turn is triggered by insertion of the key into the ignition switch and turning the ignition switch to either the "on" or the "accessory" position. The deactivating circuit then will open the contact 26, thereby de-energizing output relay 66 and interrupting the voltage input to the capacitor 84.

Figure 2:
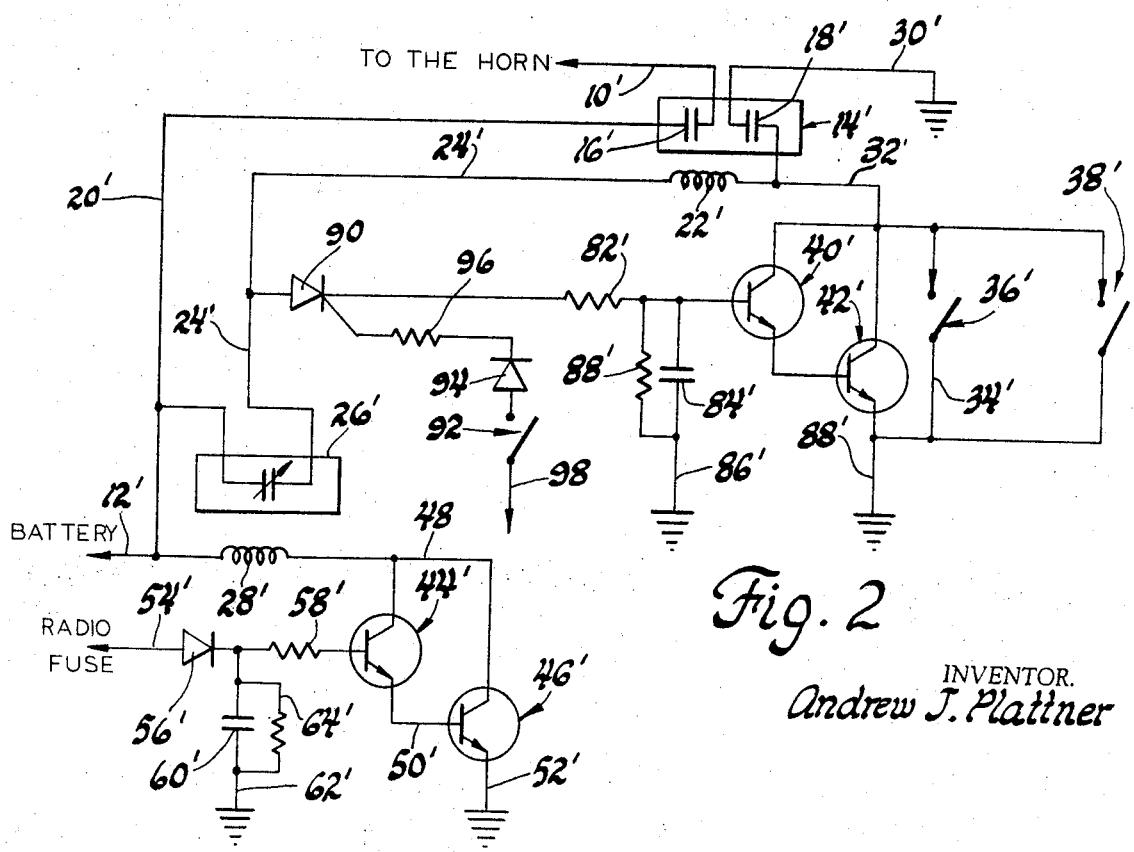
FIG. 2 is a view corresponding to FIG. 1 but including a modified switching relay for the vehicle horn.

The circuitry of FIG. 1 is used only in those instances when one side of the door jamb switch is grounded, such as at 78. In those installations where one side of the door jamb switch is connected to the other side of the battery rather than to the ground, the circuit of FIG. 2 is used. This circuit includes a silicon controlled rectifier or switching gate 90 situated between normally closed relay 26 and the door jamb switch 92. The gate for the rectifier 90 is connected to the door jamb switch 92 through a rectifier diode 94. This connection is established by resistance 96.

The other circuit elements of the FIG. 2 embodiment are the same as the circuit elements for the FIG. 1 embodiment, and they have been designated by similar reference characters although prime notations are added.

When the door jamb switch of the FIG. 2 embodiment is closed, a voltage is impressed on the gate of the silicon controlled rectifier 90 because then a complete circuit is established between energized battery terminal 98 and the base of rectifier 90. This causes the rectifier 90 to conduct voltage from the output side of the normally closed relay 26' to the input side of the time delay storage capacitor 84'. Thus the rectifier 90 and the diode 94 perform the same functions in the FIG. 2 embodiment as the relay 66 and the diode 74 in the FIG. 1 embodiment.

Having thus described the preferred forms of my invention, what I claim and desire to secure by U.S. Letters Patent is:

1. An electrical alarm system for vehicles comprising an electrically operated signaling device and a storage battery, electrical circuitry connecting said device to said battery including a switching relay, an energizing circuit for said relay comprising a switching gate and an actuator therefor with an actuating circuit, a door switch means in said actuating circuit for controlling the actuating circuit as the vehicle door is opened and closed, a storage capacitor, said switching gate being adapted to establish a connection between said battery and the input side of said storage capacitor, a first electrical switching circuit means operatively connected to said storage capacitor and responsive to a predetermined voltage build-up in said storage capacitor for establishing a connection with said switching relay whereby said switching relay is actuated to energize the device after a predetermined voltage build-up in said capacitor, a de-activating circuit comprising a normally closed relay connecting said battery to the input side of said storage capacitor, an actuator solenoid for said normally closed relay, a second storage capacitor, a second switching circuit means for establishing a connection between said last named solenoid and one side of said battery in response to a voltage build-up in said second storage capacitor, and an operator controlled switch for selectively energizing said second storage capacitor.

2. An electrical alarm system for vehicles comprising an electrically operated signaling device and a storage battery, electrical circuitry connecting said device to said battery including a switching relay, an energizing circuit for said relay comprising a switching gate and an actuator therefor with an actuating circuit, a door switch means in said actuating circuit for controlling the switching gate as the vehicle door is opened and closed, a storage capacitor, said switching gate being adapted to establish a connection between said battery and the input side of said storage capacitor, and an electrical switching circuit means operatively connected to said storage capacitor and responsive to a predetermined voltage build-up in said storage capacitor for establishing a connection with said switching relay whereby said switching relay is actuated to energize the signaling device after a predetermined voltage build-up in said capacitor, said switching circuit means having a switch situated in parallel disposition therewith and adapted for establishing a connection between said switching relay circuit and one side of said battery when the vehicle engine hood is opened, a de-activating circuit comprising a normally closed relay connecting said battery to the input side of said storage capacitor, an actuator for said normally closed relay, a second storage capacitor, a second switching circuit means for establishing a connection through said last named actuator from one side of said battery in response to a voltage build-up in said second storage capacitor, and an operator controlled switch for selectively energizing said second storage capacitor.

3. An electrical alarm system for vehicles comprising an electrically operated signaling device and a storage battery, electrical circuitry connecting said device to said battery including a switching relay, an energizing circuit for said relay comprising a switching gate and an actuator therefor with an actuating circuit, a door switch means in said actuating circuit for controlling the switching gate as the vehicle door is opened and closed, a storage capacitor, said switching gate being adapted to establish a connection between said battery and the input side of said storage capacitor, and an electrical switching circuit means operatively connected to said storage capacitor and responsive to a predetermined voltage build-up in said storage capacitor for establishing a connection with said switching relay whereby said switching relay is actuated to energize the signaling device after a predetermined voltage build-up in said capacitor, said switching circuit means having a switch situated in parallel disposition therewith and adapted for establishing a connection between said switching relay circuit and one side of said battery when the vehicle deck lid is opened, a de-activating circuit comprising a normally closed relay connecting said battery to the input side of said storage capacitor, an actuator for said normally closed relay, a second storage capacitor, a second switching circuit means for establishing a connection through said last named actuator from one side of said battery in response to a voltage build-up in said second storage capacitor, and an operator controlled switch for selectively energizing said second storage capacitor.

4. The combination as set forth in claim 1, wherein said first switching circuit means comprises a pair of transistors, the emitter of one transistor being connected to the base of the other transistor, the emitter for the other transistor being grounded, the collectors for both transistors being connected to one side of its associated switching relay and the base of said one transistor being connected to one side of its associated storage capacitor.

5. The combination as set forth in claim 2, wherein said switching circuit comprises a pair of transistors, the emitter of one transistor being connected to the base of the other transistor, the emitter for the other transistor being grounded, the collectors for both transistors being connected to one side of its associated switching relay solenoid and the base of said one transistor being connected to one side of its associated storage capacitor.

* * * * *